March 1, 1966 R. G. SCHMITT ETAL 3,238,452
APPARATUS AND METHOD FOR DETECTING CONTAMINANTS IN A FLUID
Filed Oct. 18, 1961 2 Sheets-Sheet 1

INVENTORS
ROBERT G. SCHMITT
NORMAN W. LAMBERT
BY
*Edward H. Lang*
ATTORNEY

March 1, 1966 R. G. SCHMITT ETAL 3,238,452
APPARATUS AND METHOD FOR DETECTING CONTAMINANTS IN A FLUID
Filed Oct. 18, 1961 2 Sheets-Sheet 2

INVENTORS
ROBERT G. SCHMITT
NORMAN W. LAMBERT
BY
Edward H Cary
ATTORNEY

United States Patent Office 3,238,452
Patented Mar. 1, 1966

3,238,452
APPARATUS AND METHOD FOR DETECTING CONTAMINANTS IN A FLUID
Robert G. Schmitt and Norman W. Lambert, both of Crystal Lake, Ill., assignors, by mesne assignments, to Union Oil Company of California, Los Angeles, Calif., a corporation of California
Filed Oct. 18, 1961, Ser. No. 145,877
7 Claims. (Cl. 324—61)

This invention relates to monitoring fluids and, more particularly, to the detection of water and solid contaminants in a fluid which is relatively electrically nonconductive.

In many industries, such as the petroleum and chemical industries, it is essential that many fluids be almost or completely free of contamination by even very small amounts of minute solid particles or water, when used for certain purposes. It is therefore necessary to be able to ascertain the presence and degree of such contamination in the fluids. One of the largest-volume examples of such fluids is jet fuel which, when it enters a jet engine, must be substantially completely free of contamination by solids and undissolved water. Very efficient filters and driers are used in the lines through which the fuel tanks of jet aircraft are filled, but it is still necessary to monitor the fuel to be certain that any contaminants have been completely removed.

Unfortunately, the best and most reliable methods for detecting such contamination, especially solids, require that a sample be withdrawn from the flowing stream and subjected to time-consuming and complex tests. Because the tests take a considerable amount of time, the fuel tank of the aircraft may have been filled with contaminated fuel by the time the test is completed, in which case the tank usually must be drained and refilled with clean fuel.

Since the presence of solid and/or water contamination in a non-aqueous liquid, such as petroleum oil, causes an increase in the dielectric constant of the liquid, it has been proposed to monitor such a liquid by passing it between the plates of an electric condenser and measuring the dielectric constant. For example, the presence of 1% of water, having a dielectric constant of about 80, will will raise the dielectric constant of petroleum oil, having a dielectric constant in the order of about 2.0–2.2, approximately 0.1 unit. Solid particles in petroleum oil also increase its dielectric constant, but less than the increase caused by water. Since a capacitive-measuring cell measures the presence of both water and solid particles, a serious deficiency in the devices which have been heretofore proposed is that it has been impossible to ascertain the degree of contamination by each material.

In accordance with this invention, we have devised an apparatus for continuously monitoring fuels, and other relatively electrically non-conductive liquids, for trace amounts of fine particulate solids and undissolved water. Our apparatus is especially useful in monitoring jet fuel as it is being transferred to the fuel tank of a jet aircraft. However, it will be apparent that the usefulness of the apparatus is not so limited.

Briefly, our invention comprises diverting a side-stream of the fluid flowing through the line and conducting it through a filter-capacitive-measuring cell, and then through a second capacitive-measuring cell connected in series with the filter cell and located downstream from the same. Both of the cells are capacitors with the plates of each being connected through a selector switch to a Wheatstone bridge circuit. The change in the capacitive reactance of the filter cell is dependent on the amount of solid particles accumulated on the filter and the water concentration in the flowing liquid, while the change in the capacitive reactance of the second cell, hereinafter referred to as the water-detecting cell, is dependent only on the water concentration in the fluid, the solids having been removed by the filter unit of the first cell. The selector switch permits determination of the capacitive reactance of the water-detecting cell by comparison wtih a standard capacitor, and determination of the capacitive reactance of the filter cell by comparison with that of the water-detecting cell. Because the capacitive reactance of the filter cell is dependent on both the solid and water content of the fluid, while the capacitive reactance of the water-detecting cell is dependent on only the water content, the solid content is readily determined by connecting the two cells in opposition in the Wheatstone bridge. The net reactance is a measure of only the solid content.

It is therefore an object of this invention to provide an apparatus and method for detecting contamination in a liquid.

Another object of this invention is to provide an apparatus and method for detecting solid and water contamination in a liquid which is relatively electrically nonconductive.

Another object of this invention is to provide an apparatus and method for detecting the presence of water in a non-aqueous liquid.

Another object of this invention is to provide an apparatus and method for monitoring the change in the dielectric constant of a liquid.

Another object of this invention is to utilize capacitors for monitoring a liquid.

These and further objects of this invention will become apparent as the description proceeds, in reference to the attached drawings in which.

Figure 1:
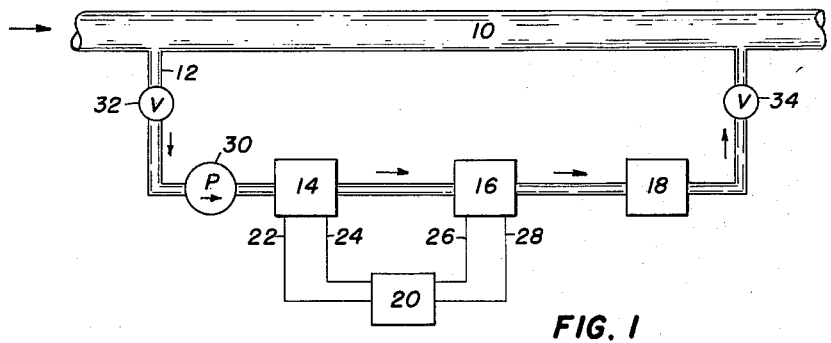
FIGURE 1 shows in block diagram the functional parts of a water- and solid-contamination-detecting system.

An over-all understanding of the invention will be facilitated by referring to FIGURE 1 which indicates in block diagram the functional parts of a complete water- and solid-contamination-detecting system. The liquid flows from line 10 into branch line 12 where it is conducted through filter-capacitive-measuring cell 14, with the capacitive reactance being due to both the water concentration in the flowing liquid and solids accumulated on the filter which is an integral part of the cell. From filter cell 14 the liquid flows through water-detecting cell 16, flowmeter 18, and thence back into line 10. Filter cell 14 is connected to Wheatstone bridge network 20 by leads 22 and 24, and water-detecting cell 16 is connected to Wheatstone bridge network 20 by leads 26 and 28. The flow of the side-stream through branch line 12 is assured by placing pump 30 in branch line 12. Valves 32 and 34 are provided to close off branch line 12 when not in use.

Figure 2:
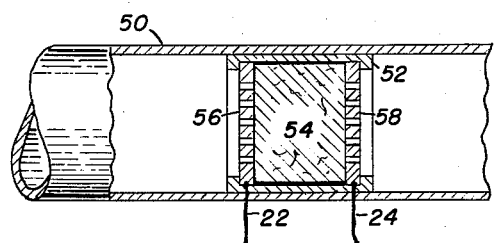
FIGURE 2 is a cross-sectional view of the novel filter-capacitive-measuring cell of this invention disposed in a section of pipe.

Referring to FIGURE 2, an embodiment of the novel filter-capacitive-measuring cell 14 is illustrated disposed in pipe 50 and held in place by frame 52. Filter cell 14 consists of filter 54, capable of removing fine particulate solids from the flowing liquid, positioned between foraminated electrically conductive plates 56 and 58. No invention is claimed in the specific filter used, but any of the filters that are either now or hereafter available for removing solids from a liquid can be used. The filter 54 which is used depends on the nature of the fluid and the solid particles contained therein. For example, suitable filters for removing from a jet fuel the particulate solids that are normally contained therein are sold under the proprietary name of Millipore. Plates 56 and 58 are connected by leads 22 and 24, respectively, into Wheatstone bridge 20 as a capacitor.

Figure 3:
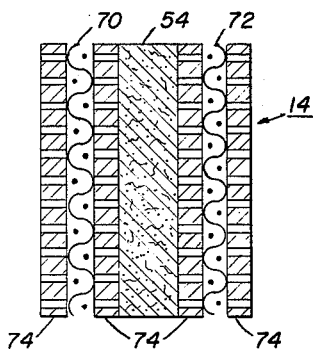
FIGURE 3 is a cross-sectional view of another embodiment of the novel filter-capacitive-measuring cell of this invention.
Figure 4:
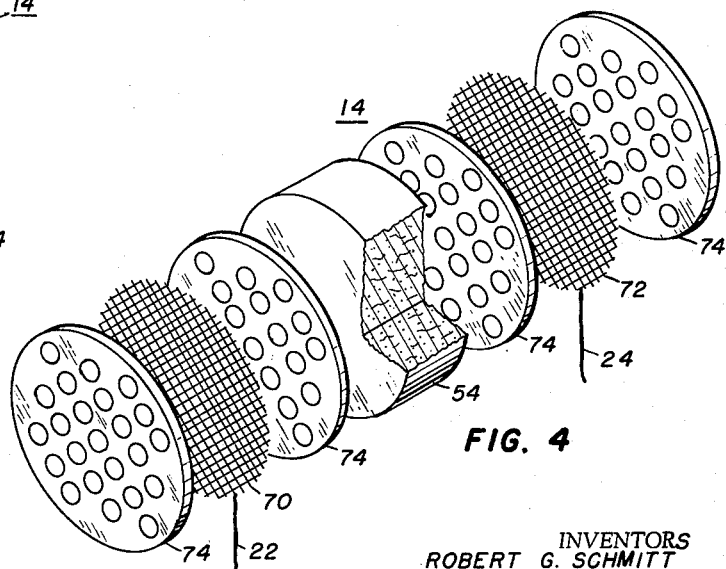
FIGURE 4 is an exploded fragmentary isometric view of the embodiment of the filter-capacitive-measuring cell shown in FIGURE 3.

In the embodiment of filter cell 14 illustrated in FIGURES 3 and 4, the capacitor plates are wire grids 70 and 72. If desired, wire grids 70 and 72 can be imbedded between sheets of a porous, electrically non-conductive material, as shown in FIGURES 3 and 4, to give them greater strength for resisting the flowing fluid. The material used is preferably inert to the fluid being monitored. Suitable materials include glass, ceramics, plastics such as polyethylene, fluorinated ethylene polymers, etc. The grid assemblies may, for example, be prepared by laminating wire screen between sheets of plastic 74, such as polyethylene, and then perforating the assembly with sufficient holes to permit relatively non-restricted flow therethrough. As in the embodiment described in relation to FIGURE 2, filter 54 is positioned between the capacitor plates consisting of wire grids 70 and 72 imbedded in plastic sheets 74, and wire grids 70 and 72 are connected to Wheatstone bridge network 20 by leads 22 and 24, respectively.

Figure 5:
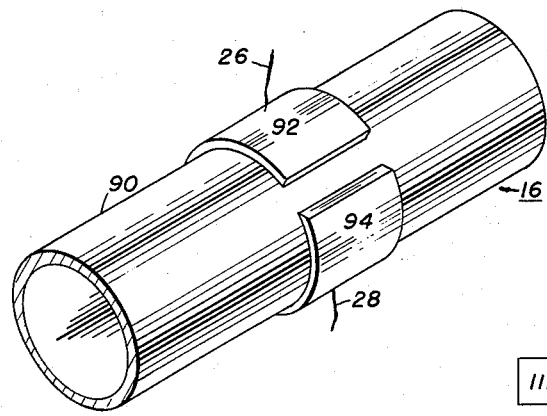
FIGURE 5 is an isometric view of one form of a water-detecting cell.

One form of a capacitor which serves as water-detecting cell 16 is illustrated in FIGURE 5. The liquid being monitored on a continuous basis flows through conduit 90 which is made of electrically non-conductive material such as glass, quartz, or a synthetic resin. Conduit 90 is disposed between semi-cylindrical metal plates 92 and 94 which are positioned against the outside wall of conduit 90. Semi-cylindrical plates 92 and 94 are connected into Wheatstone bridge network 20 as a capacitor, by leads 26 and 28.

Figure 6:
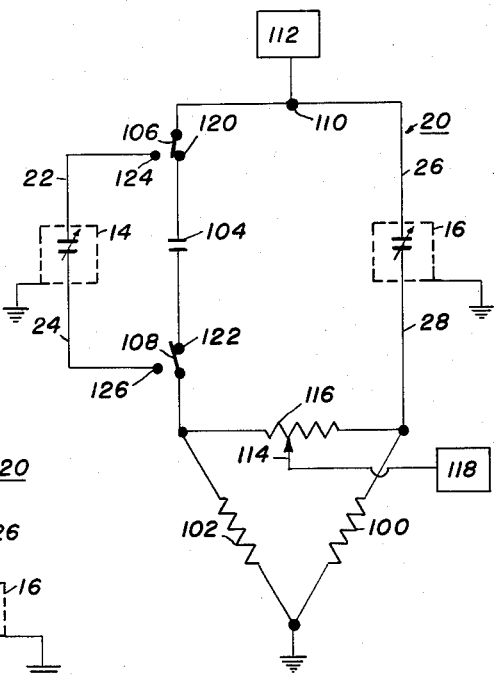
FIGURES 6 and 7 are schematic diagrams of the Wheatstone bridge network.
Figure 7:
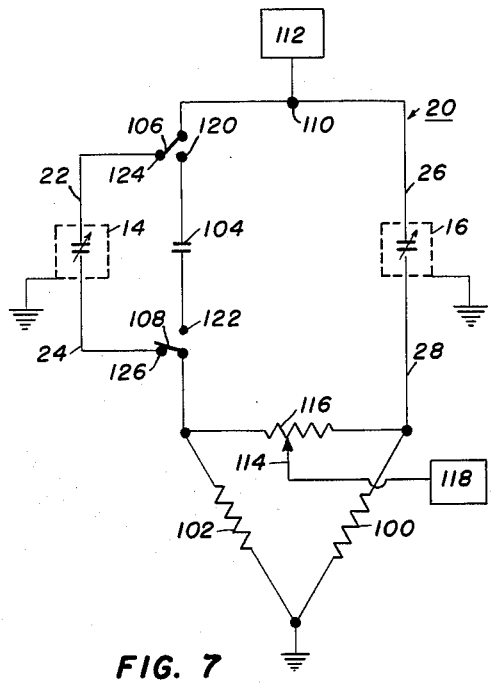

To illustrate the instant invention in its application to monitoring a flowing liquid, FIGURES 6 and 7 show Wheatstone bridge network 20 in specific detail. One branch of Wheatston bridge network 20 comprises fixed resistor 100 and water-detecting cell 16, cell 16 being connected into network 20 by leads 26 and 28. The other branch consists of fixed resistor 102 and either filter cell 14 or reference capacitor 104, depending upon the positions of multi-position switches 106 and 108. Power is supplied to bridge 20 at point 110 by oscillator 112. Balance is achieved by moving sliding contact 114 across fixed resistor 116. Sliding contact 114 is connected to amplifier 118. To ascertain the water concentration in the flowing liquid, reference capacitor 104 is coupled into bridge 20, as shown in FIGURE 6, by moving switches 106 and 108 to positions 120 and 122, respectively. Bridge 20 is then balanced by moving sliding contact 114 across fixed resistor 116. Since water-detecting cell 16 is located downstream from filter cell 14, the capacitive reactance of water-detecting cell 16 is due only to the water concentration in the flowing liquid, any solid particles in the liquid having been removed by filter 54 of filter cell 14. Because the presence of even a trace amount of water in a non-aqueous liquid, such as a petroleum product, causes a significant increase in the conductivity of the liquid, the capacitive reactance of water-detecting cell 14 is altered greatly in proportion to the water concentration in the liquid. The sliding contact may be calibrated directly in terms of water concentration, or a calibration curve may be prepared beforehand and the water content read off at the sliding contact 114 position of balance.

After the water concentration has been determined, the sediment content is determined by comparing the capacitive reactance of filter cell 14 with the capacitive reactance of water-detecting cell 16. This is done by moving switches 106 and 108 to positions 124 and 126, respectively, as shown in FIGURE 7. With switches 106 and 108 so positioned, reference capacitor 104 is disengaged from Wheatstone bridge network 20 and filter cell 14 is coupled into network 20 by leads 22 and 24. Imbalance is determined by means of sliding contact 114 connected to amplifier 118. Since the capacitive reactance of filter cell 14 is due to both the water concentration and the amount of solids accumulated on filter 54, while the capacitive reactance of water-detecting cell 16 is due only to the water concentration, it will be evident that the part of the total capacitive reactance of filter cell 14 attributable to the sediment accumulation on filter 54 is determined by connecting the two capacitive measuring cells 14 and 16 in opposing arms of the bridge circuit. The sediment concentration in the fluid being monitored is ascertained by dividing the total amount of sediment accumulated in a given time by the number of gallons flowing through the system in that time, which is read from flowmeter 18.

While the invention has been described in relation to a specific embodiment, it will be apparent that modifications can be made without departing from the scope of the invention. Our apparatus is especially useful in monitoring jet fuel as it is being transferred to the fuel tank of a jet aircraft, but it will be apparent that the usefulness of the apparatus is not so limited. In general, the apparatus can be used for monitoring any non-aqueous liquid having a relatively low electrical conductivity, i.e., in the order of about $1 \times 10^{-10}$ mhos/cm. or less. The plates of the filter cell can be of any electrically conductive material having openings to permit the flow of liquid therethrough. The water-detecting cell can be of any of the capacitor-type devices known in the art for detecting water in a non-aqueous liquid. The novel filter-capacitive-measuring cell of this invention can be used without the filter as the water-detecting cell. If desired, the water-detecting cell can take the form of the novel filter cell of this invention having a filter for absorbing water from the non-aqueous liquid being monitored. The novel filter cell of this invention can be placed in numerous types of housings having quick-opening couplings to facilitate the replacement of dirty filters with clean ones. Although the invention has been described in relation to diverting a sidestream of the flowing fluid through a branch line containing the capacitive-measuring cells, it will be evident that the cells may be disposed in the main fluid conduit if the resulting pressure drop can be tolerated.

The embodiments of the invention in which an exclusive property or privilege is claimed are defined as follows:

1. An apparatus for detecting the amount of water and solid contaminants in a non-aqueous, electrically non-conductive fluid flowing through a conduit which comprises
   (a) a liquid conduit having an inlet end and an outlet end;
   (b) first capacitor means being disposed in said conduit and including only a first pair of spaced, electrically-conductive plates disposed in said conduit normal to the direction of fluid flow through said conduit, said plates of said first pair being foraminated to permit liquid flow therethrough, and physical means between the plates of said first pair for concentrating substantially all solid contaminants in a liquid flowing between the plates of said first pair, said plates and said physical means being arranged to form a capacitor, said capacitor means dividing said conduit into two sections communicating with each other only through said capacitor means;
   (c) second capacitor means including a second pair of spaced, electrically-conductive plates disposed in said conduit normal to the direction of flow between which a liquid flowing through said conduit flows, said second pair of plates being foraminated to permit liquid flow therethrough;

(d) said second capacitor means being located downstream from said first capacitor means; and (e) physical means between the plates of said second pair of plates for concentrating substantially all water in a non-aqueous liquid flowing between the plates of said second pair.

2. An apparatus according to claim 1 in which said physical means for concentrating solid contaminants is a filter adapted to remove solid contaminants from a non-aqueous liquid.

3. An apparatus according to claim 2 in which said physical means for concentrating water is a filter adapted to remove water from a non-aqueous liquid.

4. An apparatus according to claim 3 in which each of the plates of said first and second pairs is a wire grid imbedded between two foraminated sets of an electrically non-conductive material.

5. An apparatus according to claim 1 in which at least part of said conduit is fabricated of an electrically non-conductive material and the plates of said second pair are positioned, opposed to each other, on the exterior of a part of said conduit fabricated of an electrically non-conductive material.

6. An apparatus for detecting the amount of solid contaminants in a non-aqueous, electrically non-conductive fluid containing solid contaminants and water as impurities, flowing through a conduit comprising (a) a first capacitor in said conduit having a pair of spaced foraminous plates, said capacitor forming one leg of a bridge circuit;

(b) means for flowing said fluid between the plates of said capacitor;

(c) a second capacitor along said conduit, downstream from said first capacitor, said second capacitance forming another leg of said bridge circuit;

(d) means between the plates of said first capacitor for removing solid contaminants from said fluid without removing water contained therein;

(e) means for flowing fluid in said conduit from which solid contaminants have been removed but which still contains water, between the plates of said second capacitance;

(f) and means forming part of said bridge circuit by which the amount of solid contaminants in said fluid can be determined when said circuit is balanced.

7. Apparatus in accordance with claim 6 including (g) a third reference capacitance connected in parallel with said first capacitance in said bridge circuit, and (h) switching means for alternatively connecting and disconnecting said first and third capacitances in an arm of said bridge circuit.

References Cited by the Examiner
UNITED STATES PATENTS 2,599,583 1/1952 Robinson et al. _____ 324—61
2,807,956 10/1957 Doble _____ 324—61

WALTER L. CARLSON, *Primary Examiner.*